(12) United States Patent
Ruvalcaba et al.

(10) Patent No.: US 8,909,290 B2
(45) Date of Patent: Dec. 9, 2014

(54) METHODS AND APPARATUS FOR SUBSCRIPTION MANAGEMENT IN DUAL SIM SINGLE STANDBY DEVICES

(75) Inventors: Jose Alfredo Ruvalcaba, Winchester, CA (US); Younghwan Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/413,253

(22) Filed: Mar. 6, 2012

(65) Prior Publication Data
US 2013/0237197 A1   Sep. 12, 2013

(51) Int. Cl.
*H04W 76/00* (2009.01)

(52) U.S. Cl.
USPC .......................... 455/558; 455/418; 455/552.1

(58) Field of Classification Search
CPC .......... H04B 1/38; H04M 1/00; H04W 76/02; H04W 76/00; H04W 8/183
USPC ........ 455/418, 558, 432.1–432.3, 552.1, 433, 455/410, 411
See application file for complete search history.

(56) References Cited

U.S. PATENT DOCUMENTS

| | | | |
|---|---|---|---|
| 6,304,454 B1 | 10/2001 | Akamatsu et al. | |
| 7,003,319 B1 * | 2/2006 | Howell et al. | 455/558 |
| 8,010,152 B2 | 8/2011 | Kim | |
| 8,064,898 B2 | 11/2011 | Carnall | |
| 8,121,601 B2 | 2/2012 | Huang et al. | |
| 2007/0082705 A1 * | 4/2007 | Jain et al. | 455/558 |
| 2007/0232354 A1 * | 10/2007 | Moscovitz et al. | 455/557 |
| 2009/0088211 A1 | 4/2009 | Kim | |
| 2010/0203867 A1 * | 8/2010 | Wu | 455/414.1 |
| 2010/0279737 A1 | 11/2010 | Joppek et al. | |
| 2011/0081951 A1 | 4/2011 | Hwang | |
| 2011/0269503 A1 | 11/2011 | Park et al. | |
| 2011/0280166 A1 | 11/2011 | Nien et al. | |
| 2012/0142348 A1 * | 6/2012 | Park et al. | 455/435.1 |
| 2013/0065644 A1 * | 3/2013 | Bishop et al. | 455/558 |

FOREIGN PATENT DOCUMENTS

| | | | | |
|---|---|---|---|---|
| EP | 2043395 A1 | 4/2009 | | |
| GB | 2336507 A | 10/1999 | | |
| WO | WO-2006085107 A1 | 8/2006 | | |
| WO | WO 2006085107 A1 * | 8/2006 | | 455/558 |
| WO | WO-2009063093 A2 | 5/2009 | | |

OTHER PUBLICATIONS

International Search Report and Written Opinion—PCT/US2013/029369—ISA/EPO—Jul. 10, 2013.

* cited by examiner

*Primary Examiner* — Kashif Siddiqui
*Assistant Examiner* — Farideh Madani
(74) *Attorney, Agent, or Firm* — Michael F. Taveira

(57) ABSTRACT

Methods and apparatus for subscription management in dual SIM devices may include using a first subscription associated with a first SIM card of a wireless device to communicate with a network. The methods and apparatus may further include detecting a presence of a second SIM card in the wireless device and automatically initializing a second subscription associated with the second SIM card in response to the detection. The methods and apparatus may also include attempting to connect to the network using the second subscription.

29 Claims, 9 Drawing Sheets

METHODS AND APPARATUS FOR SUBSCRIPTION MANAGEMENT IN DUAL SIM SINGLE STANDBY DEVICES

BACKGROUND

1. Field

Aspects of the present disclosure relate generally to wireless communication systems, and more particularly, to subscription management in a dual SIM single standby device.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Other example networks include GPRS/EDGE, CDMA/DO, and/or EUTRAN (4G LTE).

Some wireless devices are configured to facilitate communication via two separate subscriptions. For instance, dual subscriber identity module (SIM) single standby devices may include two SIM cards—one card for a first subscription and a second card for a second subscription. In dual SIM single standby devices, typically one of the two subscriptions are selected as a designated voice and/or data subscription, where the chosen subscription will serve as the provider of data services to the wireless device.

The SIM card associated with the designated voice and/or data subscription selected by the user will be active while the other SIM card is inactive. Upon detecting the presence of a second SIM card (e.g., a user inserts a second SIM card into the device), a user is typically presented with menu selections to switch to the newly inserted SIM card. Until the user selects to switch to the newly inserted SIM card, the device will not use the voice and/or data subscription associated with the newly inserted SIM as the provider of data services. Thus, switching between subscriptions can be a cumbersome process requiring user intervention.

Therefore, it would be desirable to have a method and apparatus that automatically switches from the voice and/or data subscription associated with the active SIM card to the voice and/or data subscription associated with the newly inserted SIM card upon detecting the presence of the newly inserted SIM card.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of subscription management. The method may include using a first subscription associated with a first SIM card of a wireless device to communicate with a network. The method may also include detecting a presence of a second SIM card in the wireless device. In addition, the method may include powering down the first SIM card in response to the detection. The method may also include initializing a second subscription associated with the second SIM card in response to the detection. The method may further include attempting to connect to the network using the second subscription.

Another aspect relates to at least one processor configured for subscription management. The processor may include a first module for using a first subscription associated with a first SIM card of a wireless device to communicate with a network. The processor may also include a second module for detecting a presence of a second SIM card in the wireless device. The processor may additionally include a third module for powering down the first SIM card in response to the detection. The processor may include a fourth module for initializing a second subscription associated with the second SIM card in response to the detection. Moreover, the processor may include a fifth module for attempting to connect to the network using the second subscription.

Yet another aspect relates to a computer program product. The computer program product may include a computer-readable medium including at least one instruction for causing a computer to use a first subscription associated with a first SIM card of a wireless device to communicate with a network. The computer readable medium may also include at least one instruction for causing the computer to detect a presence of a second SIM card in the wireless device. In addition, the computer readable medium may include at least one instruction for causing the computer to power down the first SIM card in response to the detection. The computer readable medium may further include at least one instruction for causing the computer to initialize a second subscription associated with the second SIM card in response to the detection. The computer readable medium may also include at least one instruction for causing the computer to attempt to connect to the network using the second subscription.

Another aspect relates to an apparatus. The apparatus may include means for using a first subscription associated with a first SIM card of a wireless device to communicate with a network. The apparatus may also include means for detecting a presence of a second SIM card in the wireless device. The apparatus may additionally include means for powering down the first SIM card in response to the detection. The apparatus may also include means for initializing a second subscription associated with the second SIM card in response to the detection. The apparatus may further include means for attempting to connect to the network using the second subscription.

Yet another aspect relates to an apparatus. The apparatus may include a subscription manager configured to use a first subscription associated with a first SIM card of a wireless device to communicate with a network. In addition, the apparatus may include a SIM driver configured to detect a presence of a second SIM card in the wireless device, power down the first SIM card in response to the detection, and initialize a second subscription associated with the second SIM card in response to the detection. The subscription manager may be further configured to attempt to connect to the network using the second subscription.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described apparatus and methods may include using a first subscription associated with a first SIM card of a dual SIM single standby device to communicate with a network. Upon detecting a presence of a second SIM in the device (e.g., a user inserts the second SIM into the device), the described apparatus and methods may automatically attempt to initialize the second SIM card. In addition, the described apparatus and methods may power down the first SIM card and may attempt to connect to the network using a second subscription associated with the second SIM card. By automatically initializing the second SIM card when the presence of the second SIM card is detected, the user is able to continue using the device without an interruption in service. Moreover, by powering down the first SIM card, battery power may be conserved by only providing power to the active SIM card in the wireless device.

As used herein, the term "SIM" may refer to a Subscriber Identity Module (e.g., a Smart Card) that is used to identify and authenticate a subscriber to the network regardless of the network type and/or card type. For example, the term "SIM" may include one or more of a Universal Subscriber Identity Module (USIM), Universal Integrated Circuit Card (UICC), Internet Protocol Multimedia Services Identity Module (ISIM), Removable User Identify Module (RUIM), and CDMA Subscriber Identity Module (CSIM). In some aspects, for example, the SIM card may include one or more of a unique serial number (ICCID), international mobile subscriber identity (IMSI), security authentication and ciphering information, temporary information related to the local network, a list of services the user has access to, and two passwords: a personal identification number (PIN) for ordinary use and a personal unblocking code (PUK) for PIN unlocking.

Figure 1:
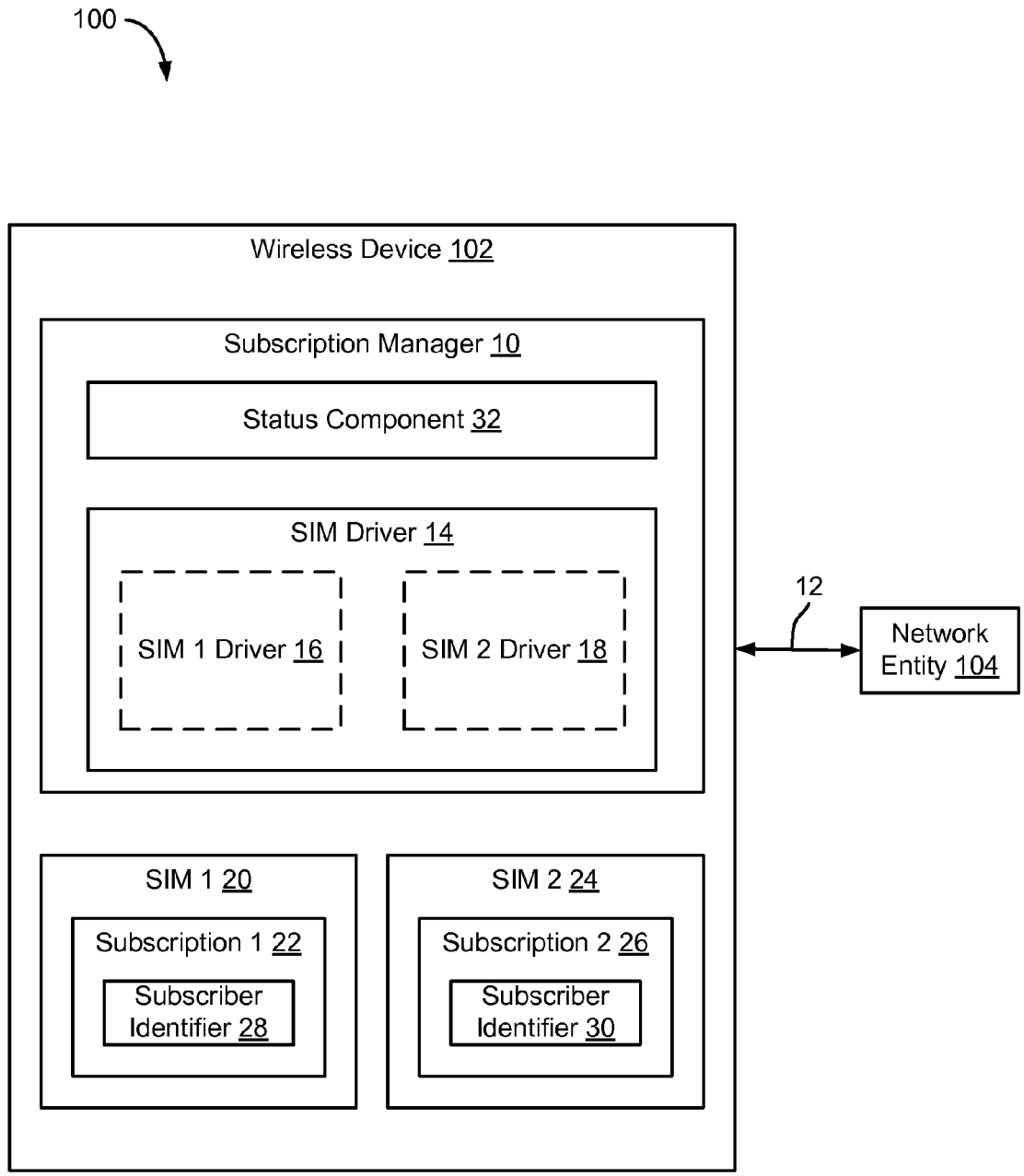
FIG. 1 is an illustration of a connectivity system in accordance with an aspect.

Referring now to FIG. 1, a wireless communication system 100 is illustrated. System 100 includes one or more wireless devices 102 that communicate with one or more network entities 104 to receive wireless network access. Network entity 104 may include one or more of any type of network component, such as an access point, including a base station (BS) or node B, a relay, a peer-to-peer device, a radio network controller (RNC), an authentication, authorization and accounting (AAA) server, a mobile switching center (MSC), etc., that can enable wireless device 102 to communicate and/or that can establish and maintain a communication link 12.

Wireless device 102 may include any mobile, portable computing or communications device, such as a cellular device, that may connect to network entity 104. Wireless devices 102 may be, for example, a cellular telephone, a navigation system, a computing device, a camera, a PDA, a music device, a gaming device or a handheld device having wireless connection capability, among other devices.

In an aspect, wireless device 102 may be a device that accesses a network, such as via network entity 104, based on subscription information in a SIM. For example, wireless device 102 may be a dual SIM single standby device. For example, wireless device 102 may include a first SIM 20, and a second SIM 24. The first SIM 20 may be associated with a first subscription 22 while the second SIM 24 may be associated with a second subscription 26. The first subscription 22 and the second subscription 26 may be a voice and/or data subscription. In addition, the first subscription 22 may have a subscription identifier 28 and the second subscription 26 may have a subscription identifier 30. The first subscription 22 and the second subscription 26 may be associated with the same technology type, the same network operator, different technology types, and/or different network operators. Technology types and/or networks may include, but are not limited to, 2G technology, such as, but not limited to, GSM, GPRS, or EDGE; 3G technology, such as, but not limited to, data optimized (DO), WCDMA, Time Division Synchronous Code Division Multiple Access (TDS-CDMA), or any other third-generation mobile communications technology; and 4G technology, such as, but not limited to, Long-Term Evolution (LTE), Time-Division Long-Term Evolution (TD-LTE), EUTRAN (4G LTE), or any other fourth-generation mobile communications technology. Thus, the first SIM 20 may be able to access the same technology and/or network as the second SIM 24 and/or may be able to access a different technology and/or network than the second SIM 24.

It should further be noted that a priority value may be assigned to the first SIM 20 and the second SIM 24. The priority value may determine which SIM the wireless device chooses to use for communicating with network entity 104. For example, if the second SIM 24 has a higher priority value than the first SIM 20, wireless device 102 may use the second SIM 24 for communicating with network entity 104. Further, for example, if the first SIM 20 is a default SIM for communicating with network entity 104, the second SIM 24 may be inserted and/or removed from wireless device 102. If, for example, the second SIM 24 is a default SIM for communicating with network entity 104, the first SIM 20 may be inserted and/or removed from wireless device 102.

In an aspect, the first SIM 20 may be unable to be removed from wireless device 102 and the second SIM 24 may be removable from wireless device 102. For example, the first SIM 20 may be embedded in wireless device 102 (as used herein, "embedded" refers to fixed in place, e.g., soldered to or otherwise retained in wireless device 102 in a manner that discourages removal), and therefore, may not be accessible by a user of wireless device 102. By embedding the SIM into the wireless device, issues relating to vibrations and temperature extremes may be eliminated and/or reduced. In another aspect, the second SIM 24 may be embedded in wireless device 102, and therefore, may not be accessible by a user of wireless device 102 and the first SIM 20 may be removable from wireless device 102, and therefore, may be accessible by a user of wireless device 102.

Wireless device 102 may further include a subscription manager 10 operable to manage subscriptions 22, 26 of the first SIM 20 and the second SIM 24, respectively. Subscription manager 10 may select one of the subscriptions 22, 26 to communicate with network entity 104.

In an aspect, subscription manager 10 may determine a default subscription for communicating with network entity 104. The default subscription may be based upon user selection and/or based upon whether the SIM is embedded in the wireless device. For example, if the first SIM 20 is embedded into wireless device 102, subscription manager 10 may determine that the first subscription 22 is a default subscription for communicating with network entity 104. The default subscription may be a pre-established communication plan associated with a particular service provider. For example, the original equipment manufacturer (OEM) of the wireless device may have a pre-established relationship with a specific service provider and embed a SIM card into the wireless device with a communication plan associated with the specific service provider. The parameters of the communication plan may be negotiated between the OEM and the service provider. For example, the parameters may be a pay as you go service plan (e.g., an hour of connectivity for a $1.00) and/or a monthly service plan. In addition, the parameters of the communication plan may provide limited data connectivity with the service provider. Moreover, the user of the wireless device 102 may not have input on the parameters of the communication plan associated with the default subscription of the wireless device.

Subscription manager 10 may further include a status component 32 operable to determine a status of the first SIM 20 and the second SIM 24. The status may include, for example, whether the second SIM 24 has been inserted and/or removed from wireless device 102. In addition, the status may also include, for example, whether the first SIM 20 is powered on and/or powered off In an aspect, upon the status component 32 receiving a notification that the second SIM 24 has been inserted into wireless device 102, subscription manager 10 may determine that the second subscription 26 may have a higher priority than the first subscription 22 (e.g., the default subscription), and therefore, subscription manager 10 may automatically switch to using the second subscription 26 for communicating with network entity 104. For example, the second subscription 26 may provide a communication plan with more data connectivity. Moreover, upon the status component 32 receiving a notification that the second SIM 24 has been removed from wireless device 102, subscription manager 10 may automatically switch back to using the first subsection 22.

Figure 2:
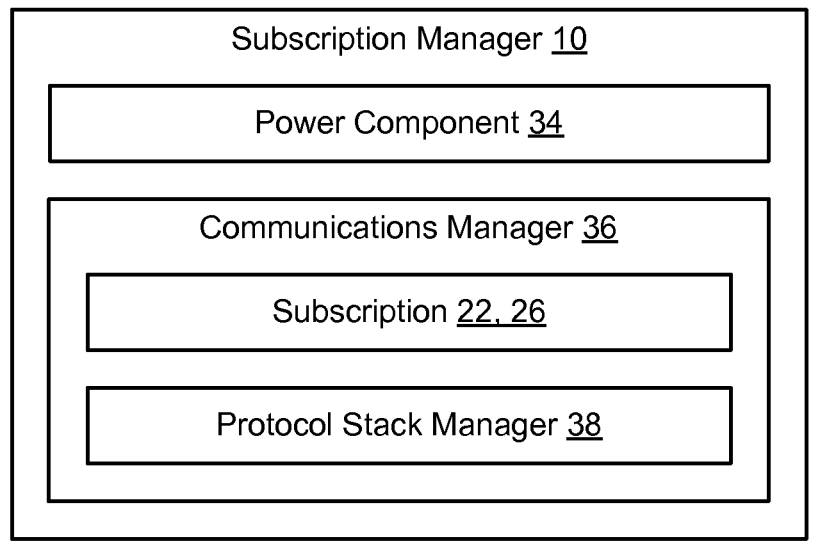
FIG. 2 is an illustration of an example subscription manager component in accordance with an aspect.

Referring now to FIG. 2, subscription manager component 10 may further include a power component 34 operable to manage the power provided to the first and second SIM 20, 24 and/or the respective SIM card slots. For example, power component 34 may power down the first SIM 20 card upon receiving a notification that the second SIM 24 has been inserted into wireless device 102. In addition, power component 34 may power up the first SIM 20 upon determining that the second SIM 24 has been removed from wireless device 102. By powering down and/or powering up the first SIM 20, battery power may be conserved by not supplying power to multiple SIMs at the same time. Power component 34 may interface with status component 32 (FIG. 1) by providing status component 32 with a message indicating the power status of the first SIM 20 (e.g., the first SIM 20 has power and/or the first SIM 20 is powered down).

Subscription manager 10 may also include a communication manager 36 operable for selecting a subscription 22, 26 for communicating with network entity 104. For example, upon the status component 32 (FIG. 1) determining that the second SIM 24 has been inserted into wireless device 102, communication manager 36 may detach the first subscription 22 associated the first SIM 20 from network entity 104. In addition, communication manager 36 may attach the subscription 26 to network entity 104. Thus, communication manager 36 may add and/or remove one or more subscriptions for communicating with network entity 104. Communication manager 36 may also include a protocol stack manager 38 operable to power down the protocol stack associated with the subscription of the SIM that is being detached from the network. In addition, the protocol stack manager 38 may be operable to power up the protocol stack associated with the subscription of the SIM that is being attached to the network. Battery power may be saved by only having one protocol stack running.

Referring back to FIG. 1, wireless device 102 may further include a SIM driver 14 operable to control the SIM card slots associated with the first SIM 20 and the second SIM 24. SIM driver 14 may include a first SIM driver 16 operable to control the SIM card slot associated with the first SIM 20. SIM driver 14 may also include a second SIM driver 18 operable to control the SIM card slot associated with the second SIM 24. Although SIM driver 14 is illustrated as part of subscription manager 10, it should be noted that SIM driver 14 may be a separate component.

Figure 3:
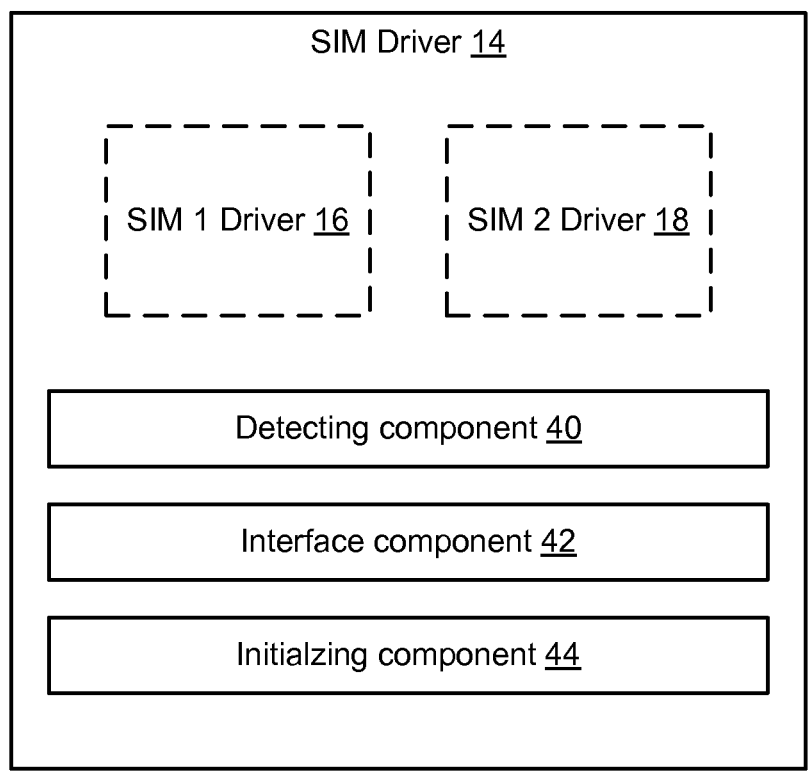
FIG. 3 is an illustration of an example SIM driver component in accordance with another aspect.

Referring now to FIG. 3, SIM driver 14 may include a detecting component 40 operable to detect whether a SIM card is present in wireless device 102. For example, detecting component 40 may detect whether a SIM card has been inserted and/or removed from wireless device 102. In an aspect, detecting component 40 may use hardware detect logic for determining whether a SIM card has been inserted and/or removed from wireless device 102. For example, detecting component 40 may assign a pin in the SIM slot so that if a SIM card is touching the assigned pin, detecting component 40 may determine that the SIM card has been inserted and remains in wireless device 102. If the SIM card is no longer touching the assigned pin, detecting component 40 may determine that the SIM card has been removed from wireless device 102.

In another aspect, detecting component 40 may use software logic for determining whether a SIM card has been inserted and/or removed from wireless device 102. For example, detecting component 40 may send a command to the SIM card within a time interval (e.g., periodically poll the SIM card). If the SIM card provides a response to the poll, detecting component 40 may determine that the SIM card is inserted into wireless device 102. If the SIM does not provide a response to the poll, detecting component 40 may determine that the SIM card has been removed from wireless device 102.

Detecting component 40 may communicate with status component 32 (FIG. 1). For example, if detecting component 40 determines that the second SIM 24 has been inserted into wireless device 102, detecting component 40 may send a notification to status component 32 indicating that the second SIM 24 has been inserted in wireless device 102. In addition, if detecting component 40 determines that the second SIM 24 has been removed from wireless device 102, detecting component 40 may send a notification to status component 32 indicating that the second SIM 24 has been removed from wireless device 102.

Detecting component 40 may also communicate with an interface component 42. Interface component 42 may enable and/or disable the interface associated with the embedded SIM on wireless device 102. For example, if SIM driver 14 receives a message from subscription manger 10 to power off the embedded SIM, interface component 42 may disable the interface associated with the embedded SIM. However, if SIM driver 14 receives a message from subscription manager 10 to power up the embedded SIM, interface component 42 may enable the interface associated with the embedded SIM.

SIM driver 14 may also include an initializing component 44 operable to initialize a subscription associated with a SIM. Initializing component 44 may receive a message from subscription manager 10 indicating which subscription to initialize. It should be noted that the first SIM driver 16 and/or the second SIM driver 18 may each have separate detecting components 40, interface components 42, and initializing components 44.

For example, upon subscription manager 10 receiving a message from detecting component 40 indicating that the second SIM 24 has been detected in wireless device 102, subscription manager 10 may send initializing component 44 a message to initialize the second SIM 24. Subscription manager 10 may further send a message to SIM driver 14 to power down the first SIM 20 and disable the interface associated with the first SIM 20. Thus, subscription manager 10 may be able to automatically switch between the first SIM 20 and the second SIM 24 upon detecting the presence of the second SIM 24.

In addition, upon subscription manager 10 receiving a message from detecting component 40 indicating that the second SIM 24 has been removed from wireless device 102, subscription manager 10 may send initializing component 44 a message to initialize the first SIM 20. Subscription manager 10 may further send a message to SIM driver 14 to power up the first SIM 20 and enable the interface associated with the first SIM 20. Thus, subscription manager 10 may be able to automatically switch to the using the first SIM 20 upon detecting the removal of the second SIM 24.

Figure 4:
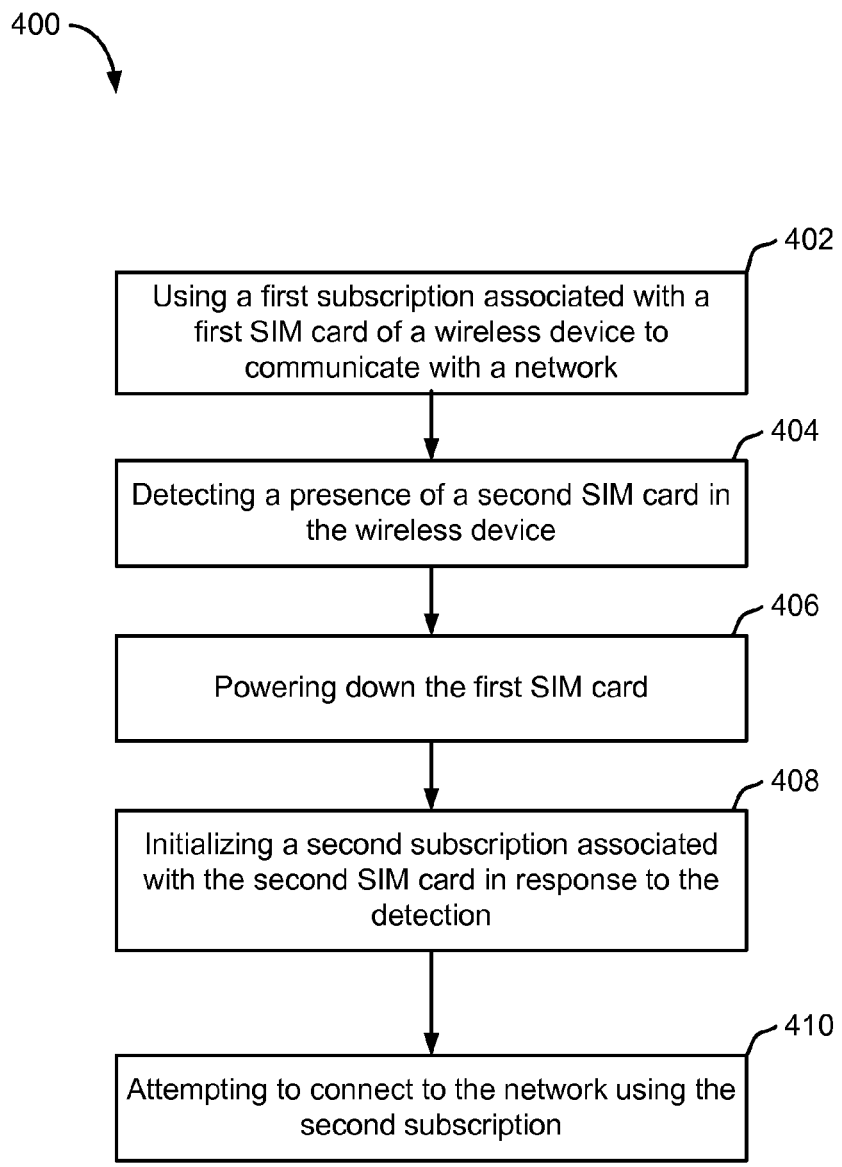
FIG. 4 is a flow chart illustrating a method for subscription management in accordance with yet another aspect.

Referring to FIG. 4, a method 400 for subscription management in accordance with an aspect includes, at 402, using a first subscription associated with a first SIM card of a wireless device to communicate with a network. For example, subscription manager 10 (FIG. 1) may select the first subscription 22 (FIG. 1) to communicate with network entity 104 (FIG. 1). The first subscription may be a default subscription for communicating with the network pre-established by the OEM of the wireless device. For example, the OEM may embed the first SIM card into the wireless device with the default subscription for communicating with a specific service provider for network access.

At 404, the method may also include detecting a presence of a second SIM. For example, subscription manager 10 may receive a notification from SIM driver 14 that the second SIM 24 has been inserted into wireless device 102. In an aspect, SIM driver 14 may detect that the second SIM 24 has been inserted through hardware detection. SIM driver 14 may have assigned a pin in the second SIM slot to detect the presence of the second SIM 24. If the second SIM 24 is touching the assigned pin, SIM driver 14 may determine that the second SIM has been inserted into wireless device 102. In another aspect, SIM driver 14 may detect that the second SIM 24 has been inserted into wireless device 102 through software detection. For example, SIM driver 14 may periodically poll the second SIM slot, and if the second SIM 24 responds to the poll, SIM driver 14 may determine that the second SIM 24 has been inserted into wireless device 102. Upon the SIM driver 14 determining that the second SIM 24 has been inserted into wireless device, SIM driver 14 may send a notification to subscription manager 10 that the second SIM 24 has been inserted into wireless device 102.

The method may further include, at 406, powering down the first SIM card. Upon subscription manager 10 receiving a notification that the second SIM 24 has been inserted into wireless device 102, subscription manager 10 may send a message to SIM driver 14 that instructs SIM driver 14 to power down the first SIM 20. By powering down the first SIM 20, battery power can be conserved, and thus, extend the battery life of the wireless device. It should be noted that prior to powering down the first SIM card, the method may include detaching the first subscription from the network, as discussed in FIG. 5.

In addition, the method may include initializing a second subscription associated with the second SIM card in response to detecting the presence of the second SIM card. For example, upon subscription manager 10 receiving an indication that the second SIM card has been inserted into wireless device 102, subscription manager 10 may automatically send a message to SIM driver 14 instructing SIM driver 14 to initialize the second subscription associated with the second SIM 24.

At 410, the method may also include attempting to connect to the network using the second subscription. In an aspect, the subscription manager 10 may attempt to use the second subscription 26 (FIG. 1) associated with the second SIM 24 to communicate with network entity 104.

Thus, upon determining that the second SIM has been inserted into the wireless device, the subscription manager may automatically switch to using the second SIM for attempting to communicate with the network entity. By automatically initializing the second SIM card when the second SIM card is detected, the user is able to continue using the device without an interruption in service. Therefore, the user experience is improved.

Figure 5:
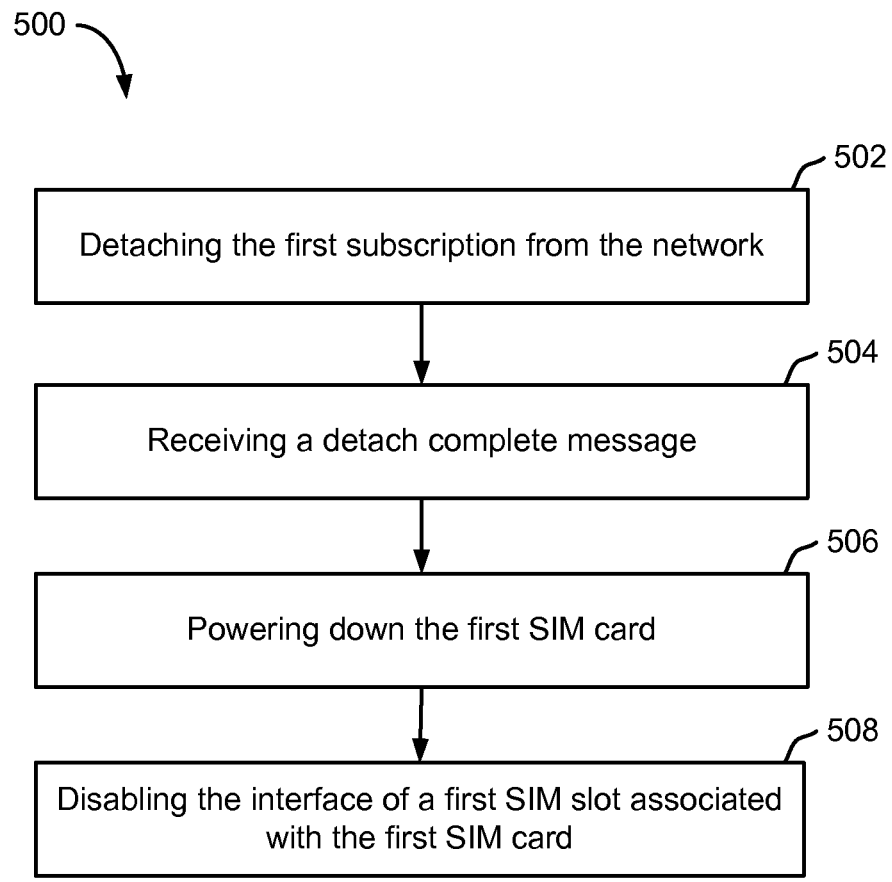
FIG. 5 is a flow chart illustrating a method for disabling a subscription in accordance with an aspect.

Referring now to FIG. 5, method 500 for disabling a subscription in accordance with an aspect includes, at 502, detaching the first subscription from the network and, at 504, receiving a detachment complete message. Subscription manager 10 may send a message to network entity 104 detaching the first subscription from the network and may receive in response to the message, a detachment complete message from network entity 104. Thus, by removing the first subscription from the network upon the detection of the presence of the second SIM card, the wireless device will only have one subscription active for communicating with the network.

The method may also include, at 506, powering down the first SIM card. In an aspect, subscription manager 10 (FIG. 1) may send a message to SIM driver 14 (FIG. 1) instructing SIM driver 14 to power down the first SIM 20 (FIG. 1) upon detecting the presence of the second SIM card 24 (FIG. 1). Powering down the first SIM card may be triggered by sending a message to the network entity to detach the first subscription and/or receiving a confirmation that detachment of the first subscription occurred. In addition, powering down the first SIM card may occur simultaneously with detaching the first subscription from the network entity.

At 508, the method may further include disabling the interface of the first SIM card. For example, upon receiving the message from subscription manager 10 to power down the first SIM 20, SIM driver 14 may disable the interface associated with the first SIM 20.

Figure 6:
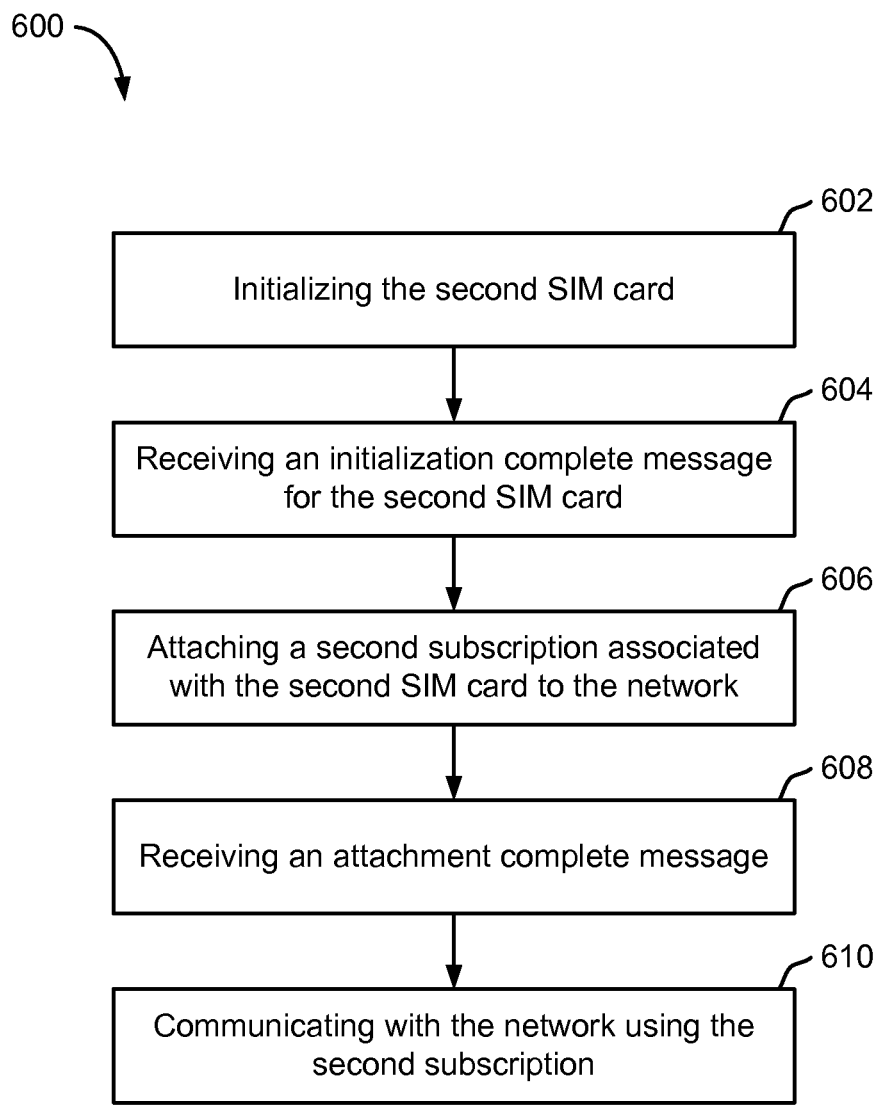
FIG. 6 is a flow chart illustrating a method for initializing a subscription in accordance with another aspect.

Referring now to FIG. 6, a method 600 for initializing a subscription in accordance with an aspect includes, at 602, initializing the second SIM card. For example, subscription manager 10 (FIG. 1) may automatically instruct SIM driver 14 (FIG. 1) to initialize the second SIM 24 (FIG. 1) upon detecting the presence of the second SIM 24 (FIG. 1).

At 604, the method may include receiving an initialization complete message. In an aspect, SIM driver 14 may send subscriber manager 10 an initialization complete message indicating that the second SIM 24 is ready to be used, e.g., that the interface associated with the second SIM slot is enabled.

At 606, the method may further include attaching a second subscription associated with the second SIM card to the network, and at 608, the method may include receiving an attachment complete message. For example, subscription manager 10 may send a message to network entity 104 attaching the second subscription 26 (FIG. 1) associated with the second SIM 24 to network entity 104, and subscription manager 10 may receive an attachment complete message from network entity 104.

The method may also include, at 610, communicating with the network entity using the second subscription. In an aspect, subscription manager 10 may use the second subscription 26 to communicate with network entity 104.

Figure 7:
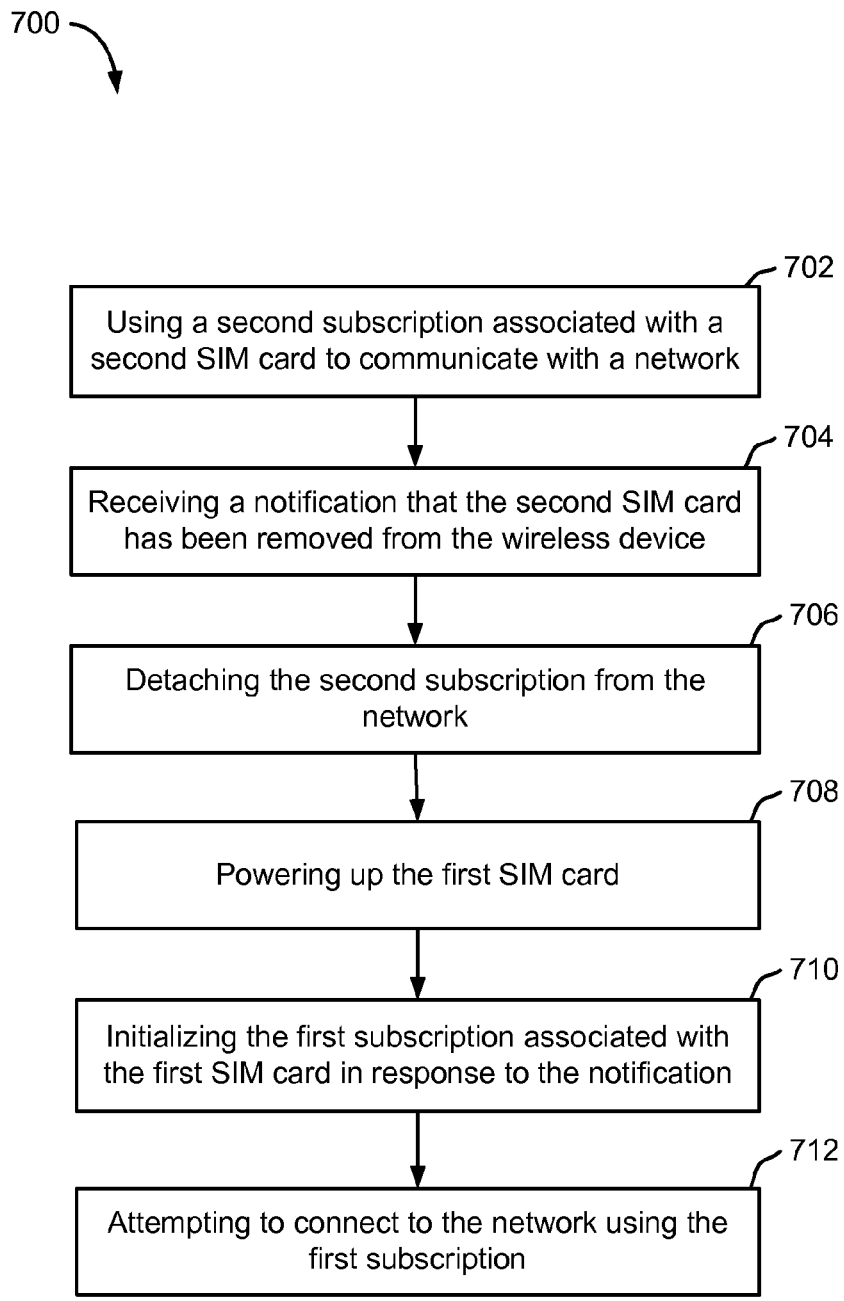
FIG. 7 is a flow chart illustrating a method for subscription management in accordance with still another aspect.

Referring to FIG. 7, a method 700 for subscription management in accordance with an aspect includes, at 702, using a second subscription associated with a second SIM card to communicate with a network. For example, subscription manager 10 may have determined that the second subscription 26 (FIG. 1) has a higher priority relative to the first subscription 22 (FIG. 1) for communicating with network entity 104 (FIG. 1), and therefore, is using the second subscription 26 for communications with network entity 104. In an aspect, subscription manager 10 may automatically determine that the second subscription 26 has a higher priority upon detecting the presence of the second SIM 24 (FIG. 1) in wireless device 102 (FIG. 1).

At 704, the method includes receiving a notification that the second SIM card has been removed from the wireless device. For example, subscription manager 10 may receive a notification from SIM driver 14 (FIG. 1) that the second SIM 24 has been removed from wireless device 102. In an aspect, SIM driver 14 may detect that the second SIM 24 has been removed through hardware detection. SIM driver 14 may have assigned a pin in the second SIM slot to detect the presence of the second SIM 24. If the second SIM 24 is no longer touching the assigned pin, SIM driver 14 may determine that the second SIM has been removed from wireless device 102. In another aspect, SIM driver 14 may detect that the second SIM 24 has been removed from wireless device 102 through software detection. For example, SIM driver 14 may periodically poll the second SIM 24, and if the second SIM 24 does not respond to the poll, SIM driver 14 may determine that the second SIM 24 has been removed from wireless device 102. Upon the SIM driver 14 determining that the second SIM 24 has been removed from the wireless device, SIM driver 14 may send a notification to subscription manager 10 that the second SIM 24 has been removed from wireless device 102.

The method may also include, at 706, detaching the second subscription from the network. Subscription manager 10 may send a message to network entity 104 detaching the second subscription from the network and may receive in response to the message, a detachment complete message from network entity 104. Thus, by removing the second subscription from the network upon the detection of the removal of the second SIM card, the wireless device will only have one subscription active for communicating with the network.

In addition, the method may include, at 708, powering up the first SIM card. Subscription manager 10 may send a notification to SIM driver 14 to power up the first SIM 20 upon receiving a notification that the second SIM 24 has been removed from wireless device 102. Powering up the first SIM card may be triggered by sending a message to the network entity to detach the second subscription and/or receiving a confirmation that detachment of the second subscription occurred. In addition, powering up the first SIM card may occur simultaneously with detaching the second subscription from the network entity.

The method may also include, at 710, initializing the first subscription associated with the first SIM card in response to the notification. For example, subscription manager 10 may automatically send a message to SIM driver 14 instructing SIM driver 14 to initialize the first SIM 20 upon receiving a notification that the second SIM 24 has been removed from wireless device 102. In addition, subscription manager 10 may receive a message from SIM driver 14 indicating that the initialization is complete and the first SIM 20 is ready for use.

At 712, the method may further include attempting to connect to the network using the first subscription. For example, subscription manager 10 may attempt to use the first subscription 22 (FIG. 1) to communicate with network entity 104. Subscription manager 10 may send a message to network entity 104 to detach the second subscription 26 from network entity 104 and attach the first subscription 22 to network entity 104. Thus, subscription manager 10 may be able to use the first subscription 22 to communicate with network entity 104.

Therefore, upon determining that the second SIM has been removed from the wireless device, the subscription manager may automatically switch to using the first subscription for attempting to communicate with the network entity. By automatically switching to use the first subscription when the second SIM card has been removed, the user is able to continue using the device without an interruption in service. Therefore, the user experience is improved.

Figure 8:
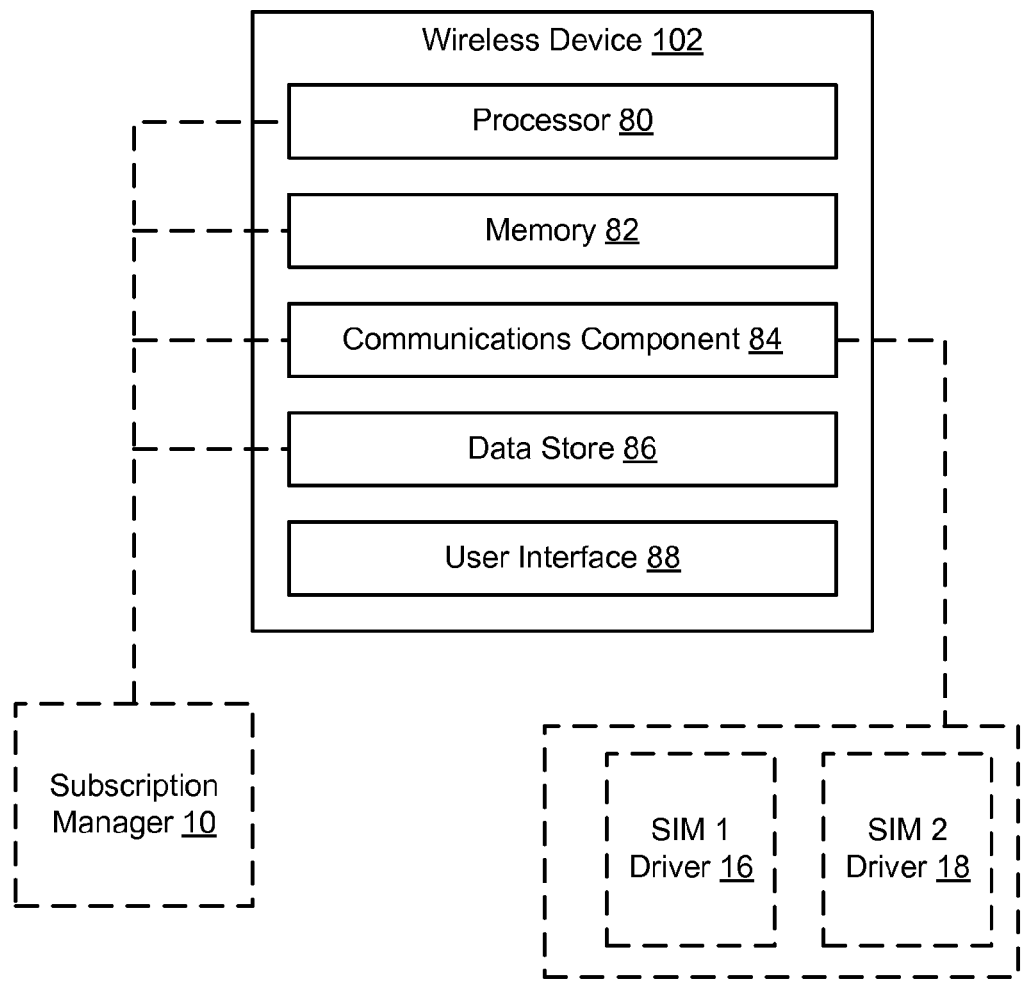
FIG. 8 is an example computer device operable within the connectivity system in accordance with an aspect.

Referring to FIG. 8, illustrated is an example wireless device 102 operable within the connectivity system in accordance with an aspect. In one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further includes a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 includes a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102 and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may include subscription manager 10 (FIG. 1), such as in specially programmed computer readable instructions or code, firmware, hardware, or some combination thereof. In addition, wireless device 102 may include first SIM driver 16 (FIG. 1) and second SIM driver 18 (FIG. 1). In an aspect, communications component 84 may transmit and/or receive messages corresponding to the operation of subscription manager 10, first SIM driver 16 and second SIM driver 18. In addition, processor 80 may execute subscription manager 10, first SIM driver 16 and second SIM driver 18 and memory 82 or data store 86 may store them.

Figure 9:
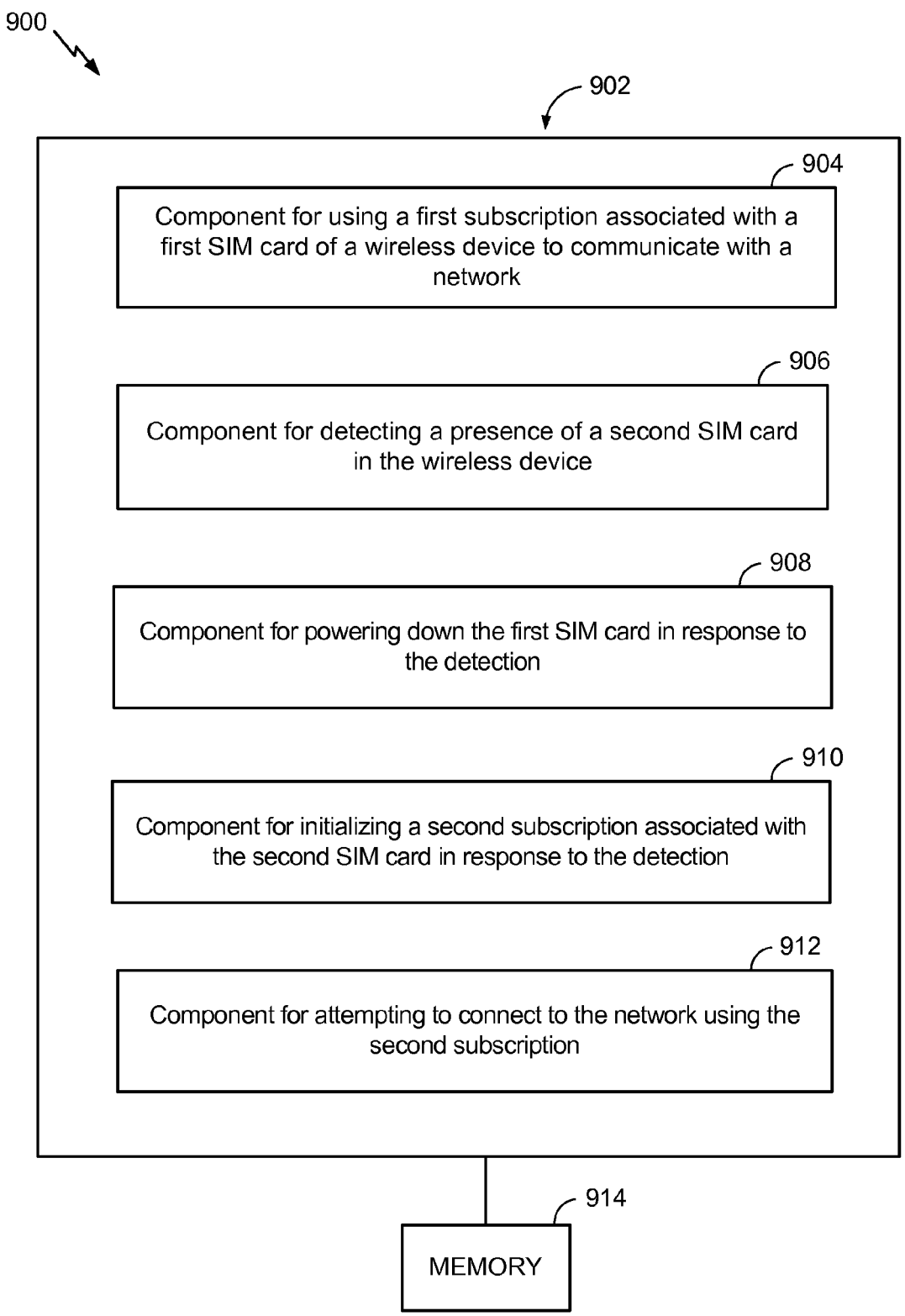
FIG. 9 is an example system that facilitates error recovery in accordance with still another aspect.

Referring now to FIG. 9, illustrated is a system 900 configured for subscription management. For example, system 900 can reside at least partially within a transmitter, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that facilitate subscription management. For instance, logical grouping 902 may include component 904 for using a first subscription associated with a first SIM card of a wireless device to communicate with a network. Further, logical grouping 902 may comprise component 906 for detecting a presence of a second SIM card in the wireless device. In addition, logical grouping 902 may include component 908 for powering down the first SIM card in response to the detection. Logical grouping 902 may also include component 910 for initializing a second subscription associated with the second SIM card in response to the detection. Moreover, logical grouping 902 may comprise component 912 for attempting to connect to the network using the second subscription. Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. If implemented in software, the functions may be stored as one or more instructions or code on a non-transitory processor-readable medium. The operations of a method or algorithm disclosed herein may be embodied in a processor-executable software module that may reside on a non-transitory processor-readable storage medium. Non-transitory processor-readable storage media may be any available media that may be accessed by a computer processor. By way of example, and not limitation, such non-transitory processor-readable storage media may include RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for subscription management, the method comprising:

using a first subscription associated with a first SIM card of a wireless device to communicate with a network;

detecting a presence of a second SIM card in the wireless device;

powering down the first SIM card in response to the detection such that a power supply of the wireless device provides power to only the second SIM card;

initializing a second subscription associated with the second SIM card in response to the detection; and attempting to connect to the network using the second subscription;

detecting that the second SIM card has been removed from the wireless device;

sending a message to the network to detach the second subscription in response to detecting that the second SIM card has been removed from the wireless device; and powering up the first SIM card, wherein powering up the first SIM card is triggered by sending the message to the network to detach the second subscription.

2. The method of claim 1, wherein detecting the second SIM card occurs after a time period of using the first SIM card.

3. The method of claim 2, further comprising:
detecting only the first SIM card prior to the time period of using the first SIM card.

4. The method of claim 3, further comprising:
establishing a communication with the first subscription based on only detecting the first SIM card.

5. The method of claim 2, wherein detecting the second SIM card further comprises detecting an insertion of the second SIM card into the wireless device.

6. The method of claim 1, wherein the first SIM card is embedded in the wireless device.

7. The method of claim 1, wherein the first subscription is a default subscription for communication with the network.

8. The method of claim 1, wherein initializing the second subscription occurs automatically in response to the detection.

9. The method of claim 1, wherein attempting to connect to the network using the second subscription further comprises:
detaching the first subscription from the network; and
attaching the second subscription to the network.

10. The method of claim 1, further comprising:
using the second subscription to communicate with the network.

11. The method of claim 10, further comprising:
initializing the first subscription in response to detecting that the second SIM card has been removed from the wireless device; and
attempting to connect to the network using the first subscription.

12. The method of claim 11, wherein initializing the first subscription occurs automatically in response to detecting that the second SIM card has been removed.

13. The method of claim 11, further comprising:
attaching the first subscription to the network.

14. A non-transitory processor-readable medium having stored thereon processor executable instructions are configured to cause a processor to perform operations comprising:
using a first subscription associated with a first SIM card of a wireless device to communicate with a network;
detecting a presence of a second SIM card in the wireless device;
powering down the first SIM card in response to the detection such that a power supply of the wireless device provides power to only the second SIM card;
initializing a second subscription associated with the second SIM card in response to the detection; and
attempting to connect to the network using the second subscription;
detecting that the second SIM card has been removed from the wireless device;
sending a message to the network to detach the second subscription in response to detecting that the second SIM card has been removed from the wireless device; and
powering up the first SIM card, wherein powering up the first SIM card is triggered by sending the message to the network to detach the second subscription.

15. A wireless device, comprising:
means for providing power to the wireless device;

means for using a first subscription associated with a first SIM card of the wireless device to communicate with a network;
means for detecting a presence of a second SIM card in the wireless device;
means for powering down the first SIM card in response to the detection such that the means for providing power provides power to only the second SIM card;
means for initializing a second subscription associated with the second SIM card in response to the detection; and
means for attempting to connect to the network using the second subscription;
means for detecting that the second SIM card has been removed from the wireless device;
means for sending a message to the network to detach the second subscription in response to detecting that the second SIM card has been removed from the wireless device; and
means for powering up the first SIM card, wherein powering up the first SIM card is triggered by sending the message to the network to detach the second subscription.

16. A wireless device, comprising:
a power supply;
a subscription manager configured to use a first subscription associated with a first SIM card of the wireless device to communicate with a network; and
a SIM driver configured to detect a presence of a second SIM card in the wireless device, power down the first SIM card in response to the detection such that the power supply provides power to only the second SIM card, and initialize a second subscription associated with the second SIM card in response to the detection;
wherein the subscription manager is further configured to:
attempt to connect to the network using the second subscription;
receive a notification that the second SIM card has been removed from the wireless device; and
send a message to the network to detach the second subscription in response to receiving the notification that the second SIM card has been removed from the wireless device; and
wherein the SIM driver is further configured to power up the first SIM card, wherein powering up the first SIM card is triggered by the subscription manager sending the message to the network to detach the second subscription.

17. The wireless device of claim 16, wherein the SIM driver detects the second SIM card after a time period of using the first SIM card.

18. The wireless device of claim 17, wherein the SIM driver detects only the first SIM card prior to the time period of using the first SIM card.

19. The wireless device of claim 18, wherein the subscription manager is further configured to establish a communication with the first subscription based on only detecting the first SIM card.

20. The wireless device of claim 17, wherein the SIM driver detects the second SIM card by detecting an insertion of the second SIM card into the wireless device.

21. The wireless device of claim 20, wherein the first SIM card is embedded in the wireless device.

22. The wireless device of claim 20, wherein the first subscription is a default subscription for communication with the network.

23. The wireless device of claim 20, wherein the SIM driver is configured to automatically initialize the second subscription in response to detecting the detection insertion of the second SIM card into the wireless device.

24. The wireless device of claim 20, wherein the subscription manager is further configured to:
- detach the first subscription from the network; and
- attach the second subscription to the network.

25. The wireless device of claim 20, wherein the subscription manager is further configured to communicate with the network using the second subscription.

26. The wireless device of claim 25, wherein the subscription manager is further configured to receive a notification that the second SIM card has been removed from the wireless device; and
- wherein the SIM driver is further configured to initialize the first subscription in response to the notification.

27. The wireless device of claim 26, wherein the subscription manager is further configured to attempt to connect to the network using the first subscription.

28. The wireless device of claim 26, wherein the SIM driver is configured to automatically initialize the first subscription in response to the notification.

29. The wireless device of claim 26, wherein the subscription manager is further configured to attach the first subscription to the network.

\* \* \* \* \*